United States Patent [19]

Izatt

[11] 4,188,154
[45] Feb. 12, 1980

[54] APPARATUS FOR WATERING AND DRAINING SOIL

[75] Inventor: James P. Izatt, North Vancouver, Canada

[73] Assignee: Cellsystem AG, Oftringen, Switzerland

[21] Appl. No.: 935,484

[22] Filed: Aug. 21, 1978

[30] Foreign Application Priority Data

Aug. 23, 1977 [CH] Switzerland ................ 10298/77

[51] Int. Cl.² ............... E02B 11/00; E02B 13/00
[52] U.S. Cl. ............................... 405/43; 47/48.5; 405/38
[58] Field of Search ................ 405/36, 43–49, 405/38; 47/48.5; 138/111; 239/542

[56] References Cited

U.S. PATENT DOCUMENTS

| 2,366,522 | 1/1945 | Gutman | 405/46 |
| 3,403,519 | 10/1968 | Balko | 405/45 |
| 3,426,544 | 2/1969 | Curtis | 405/44 |
| 3,645,100 | 2/1972 | La Monica | 405/46 |
| 3,698,195 | 10/1972 | Chapin | 405/44 |
| 4,102,135 | 7/1978 | Auriemma | 405/43 |

FOREIGN PATENT DOCUMENTS 1484356  4/1969  Fed. Rep. of Germany ............ 405/45

*Primary Examiner*—David H. Corbin
*Attorney, Agent, or Firm*—James E. Nilles

[57] ABSTRACT

A double-duct conduit for irrigation and drainage comprises an inner small-diameter duct secured eccentrically inside an outer large-diameter duct with the walls of the ducts closely adjacent to one another along their tops. Ports through the wall of the inner duct are spaced above the bottom thereof, to provide a sump in its bottom and are spaced below its top to provide an air chamber above the sump. The outer duct also has ports through its wall, at its opposite sides, spaced below the level of the bottom of the inner duct but a little above the bottom of the outer duct, providing a shallow sump in the bottom of the outer duct and an air chamber thereabove. During irrigation, water falls from the inner duct to the sump in the outer duct, then flows out through the outer duct ports. For drainage, water rises in the outer duct to the level of the ports in the inner duct, while slime and sediment remain in the sump in the outer duct.

9 Claims, 4 Drawing Figures

APPARATUS FOR WATERING AND DRAINING SOIL

BACKGROUND OF THE INVENTION

1. Field of Use

This invention relates to apparatus for watering and draining soil in deserts and dry areas to provide for control of plant and tree growth in such areas, and the invention is more particularly concerned with apparatus that can be used interchangeably for either watering or draining an area in which the apparatus is installed, and with installations comprising such apparatus.

2. Prior Art

One arrangement heretofore proposed for either watering or draining an area of soil in accordance with prevailing requirements is disclosed in U.S. Pat. No. 3,461,675. In this system, a trench in the area to be treated has a water-impermeable lining, and a closed-meshed duct system extends through the area. Although both irrigation and draining can be accomplished with it, the arrangement is expensive because it necessitates a great amount of excavation work for emplacement of the trench lining.

Another prior irrigation arrangement, disclosed in U.S. Pat. No. 3,698,195, comprises two ducts, one inside the other, both of which are sufficiently resilient to permit the two-duct conduit to be rolled up along its length. While offering convenience in transportation and in manipulation during emplacement and removal, this apparatus can be used only for pressure watering, owing to the relatively small space between the ducts and the suppleness of the inner duct, which retains its cross-section form only under the force of pressurized water in its interior.

U.S. Pat. No. 3,672,571 discloses a conduit comprising primary and secondary ducts, which conduit can likewise be used only for pressure watering. Although not so supple as to be readily flattened, the primary duct, to which irrigation water is supplied, has restricted outlets that reduce the pressure of the supplied water so that it enters the adjacent soil as a plurality of low-pressure trickles or drips. Because these outlets are restricted, the apparatus is not suitable for use in draining and dewatering.

In contrast to these prior arrangements, it is the general object of the present invention to provide simple and inexpensive apparatus by which either watering or drainage of an area of soil can be accomplished, in accordance with prevailing needs, and which operates substantially by natural circulation both for watering and for drainage.

It is also an object of this invention to provide a double-duct conduit that is inexpensive in itself and can be emplaced in an area to be irrigated and/or drained at relatively low cost and with a minimum of digging.

Another and more specific object of the invention is to provide apparatus of the character described which, when used for irrigation or watering, provides for entry of water into the adjacent soil in a trickle of sufficiently low pressure not to cause washing away or shifting of portions of the soil, but which is nevertheless capable of being employed for drainage or dewatering without the need for any adjustment or modification.

BRIEF SUMMARY OF THE INVENTION

In general, the objects of the invention are achieved with a double-duct conduit comprising a primary duct that is connectable, for irrigation, with a source of water and is alternatively connectable, for drainage, with a sink to which drainage water can be conducted, and a secondary duct extending along the primary duct, said conduit being characterized by the primary duct being secured to the secondary duct in the interior of the secondary duct with its axis parallel to that of the secondary duct and, with the ducts extending substantially horizontally, with an upper external surface portion of the primary duct closely adjacent to an upper internal surface portion of the secondary duct; the primary duct being sufficiently stiff to resist deformation in cross section and having ports through its wall, at intervals along its length, that are at a level between its top and its bottom; and the secondary duct having a substantially larger cross section than the primary duct so that there is a substantially large space in the secondary duct that is below the level of said ports in the primary duct, and the secondary duct having ports in its wall that are spaced along its length and are near its bottom.

DESCRIPTION OF THE PREFERRED EMBODIMENT

Figure 1:
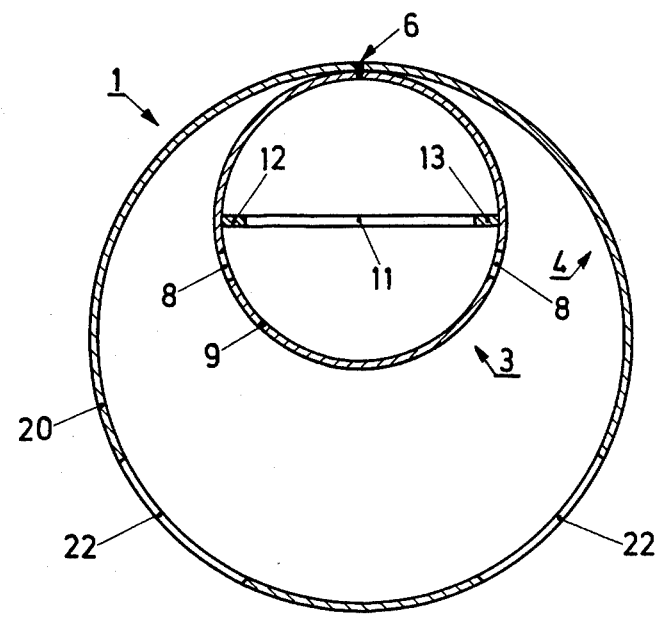
FIG. 1 is a view in cross section of a conduit for watering and drainage that embodies the principles of the present invention.

Referring now to the accompanying drawings, the numeral 1 designates generally an irrigation and drainage conduit which embodies the principles of this invention and which comprises an inner primary duct 3 and an outer secondary duct 4 that is of substantially larger diameter than the primary duct. Typically the inner primary duct can have a diameter of 80 mm., while the diameter of the outer secondary duct is about 150 mm., the preferred ratio of diameters being between about 1 to 1.5 through 1 to 2.5.

The two ducts are so connected with one another that when the conduit is disposed substantially horizontally, the uppermost portion of the external surface of the inner duct 3 is closely adjacent to the top portion of the inner surface of the outer duct 4. The two ducts can be connected in this relationship by means of a welded seam 6 that extends along their zeniths. For the formation of the seam 6, which can be intermittent along the lengths of the ducts, the outer duct 4 can have suitable cutouts; or if the seam extends continuously along the ducts the outer duct can be slitted all along its length to enable the seam to be made. Alternatively, as will be obvious (and is therefore not shown) the two ducts 3 and 4 can be provided with suitably formed connecting means such as a T-shaped bead or rib on one of them that is endwise slidably receivable in a channel-shaped or grooved rail on the other. In any event, when the two ducts are connected, their axes are substantially parallel and the bottom of the inner primary duct 3 is spaced a substantial distance above the bottom of the outer secondary duct 4.

Preferably, the conduit 1 is formed in modular sections, each of which can have a length of about 6 m., although the sections can be substantially longer if the ducts are extruded of plastic. Both of the ducts, and particularly the inner duct 3, are substantially stiff in the sense that they require no internal pressure in order to maintain their shape in cross section. To stabilize the inner duct 3, especially if it is made of plastic, it can have bridges 11 extending horizontally across its interior and/or stiffening ribs 12 and 13 that extend lengthwise along its opposite sides.

Figure 3:
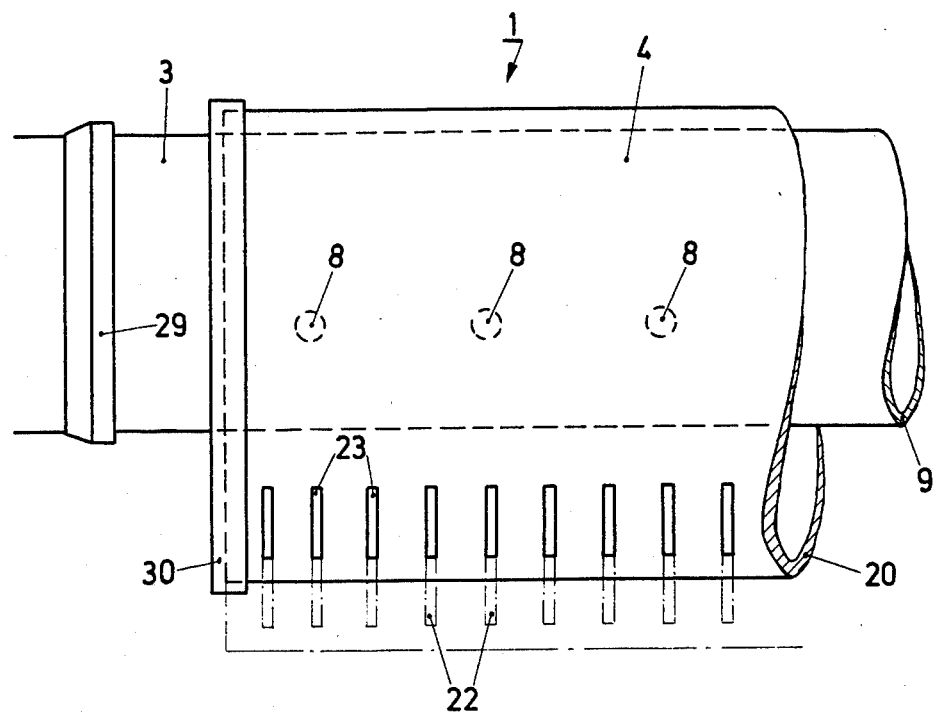
FIG. 3 is a view in side elevation of portions of two sections of the conduit shown in FIG. 1, illustrating how such conduit sections are lengthwise connected with one another.

To provide for the connection of lengthwise adjacent conduit sections with one another, the outer duct 4 of each section can terminate slightly short of the adjacent ends of the inner duct 3, as best seen in FIG. 3, and the projecting end portions of the inner duct sections can be provided with suitable mating couplings 29 of a known type. Each section of outer duct 4 has each of its ends closed by a bulkhead-like flange 30, and the adjacent end portion of the inner duct 3 projects through a closely-fitting cutout in that flange, as can also be seen in FIG. 3.

All along its length, except in its exposed end portions, the inner duct has ports 8 that open laterally through its wall 9. These ports are preferably spaced at regular intervals along the length of the inner duct and are preferably arranged symmetrically in relation to a vertical plane that contains the axes of the two ducts. Furthermore, the ports 8 are preferably round and are located a little below the horizontal plane that contains the axis of the inner duct, to be thus spaced a substantial distance above the bottom of the inner duct and a somewhat greater distance below the level of its top. Typically the ports 8 have a diameter of 5 mm. and are spaced at intervals of about 40 mm.

Because the ports 8 are at a level above the bottom of the inner duct, a liquid sump 15 tends to form therein. The highest surface level 16 of this sump, which particularly develops during drainage, is slightly above the ports 8; but normally, even during drainage, the surface level would not rise above a horizontal plane 18 near the bottoms of the ports 8. In any case, the surface level 17 establishes itself at a height determined by equilibrium between flow into the sump 15 and flow out of it.

Figure 4:
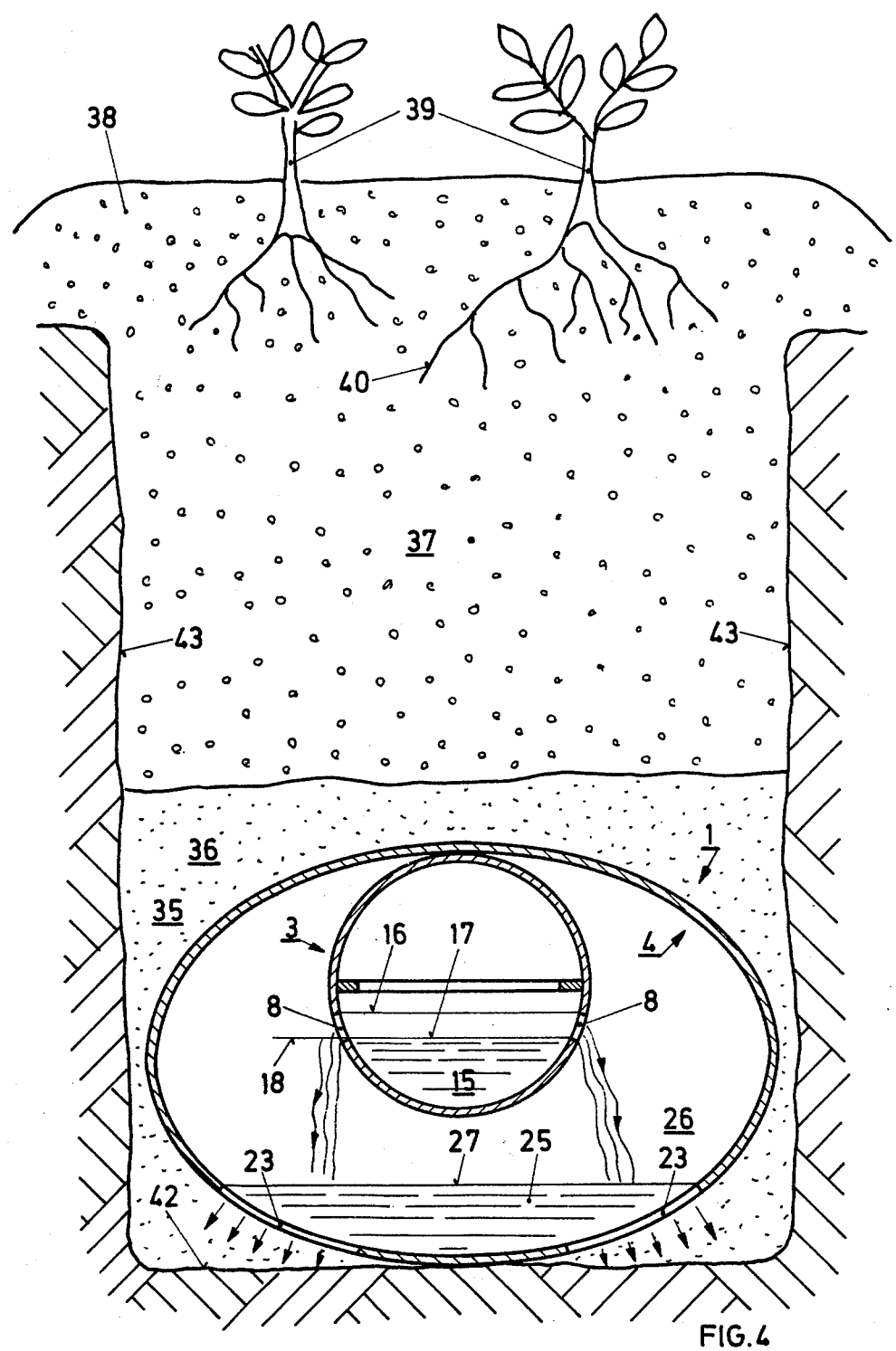
FIG. 4 is a view in cross section generally similar to FIG. 2 but more particularly illustrating how an area of soil is irrigated by means of the apparatus of this invention.

The wall 20 of the outer duct has ports 23 extending through it at intervals along its length. These ports 23 are preferably slot-like, with their longer edges extending circumferentially relative to the outer duct. The ports 23 are preferably spaced regularly along the outer duct and arranged symmetrically with respect to a vertical plane containing the axes of the ducts 3 and 4. With the outer duct 4 in its undeformed condition, the ports are shown in broken lines and designated by 22 in FIG. 3; and when the outer duct is slightly flattened by its own weight and the weight of the inner duct 3, to be deformed to the elliptical cross section shown in FIG. 2 (solid lines) and FIG. 4, the ports in it are still at a level slightly above its bottom. Preferably the ports 23 in the outer duct have a length of about 40 mm., a width of about 2 mm., and are spaced at 10 mm. intervals. The ports at opposite sides of the outer duct 4 are displaced from one another by about 120° around the circumference of that duct. Preferably the total area of the ports 23 in the outer duct is equal to the total area of the ports 8 in the inner duct.

Figure 2:
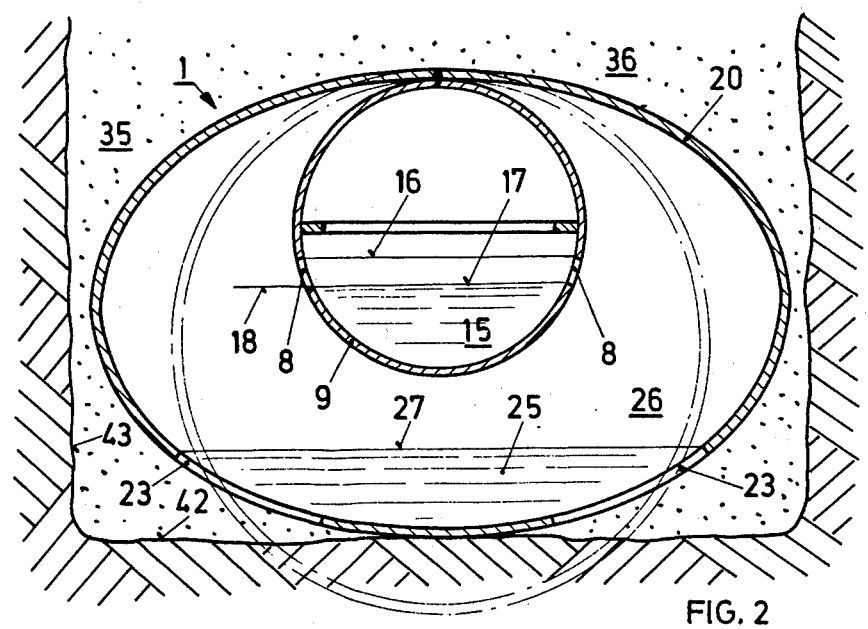
FIG. 2 is a view in cross section similar to FIG. 1 but showing the conduit emplaced in an area of soil to be watered and/or drained.

A sump 25 forms in the bottom of the outer duct, and above it there is an air chamber 26, as best seen in FIG. 2. During watering or irrigation, water that issues from the ports 8 in the primary inner duct falls through the air chamber 26 and into the sump 25 in the outer duct. When the level of water in the sump 25 rises above the bottoms of the slot-like ports 23, water flows out of those ports 27. The maximum height of water in the sump 25 during watering cannot exceed the level 27 of the upper edges of the ports 23.

The double-duct conduit 1 is installed by digging a trench 35 for it that can be about 20 cm. wide and 30 cm. deep. The trench can have a substantially flat bottom 42 and substantially vertical side surfaces 43. When the conduit is laid in place, owing to the material of its outer duct wall 20, the outer duct 4, under its own weight of the inner duct 3, deforms or flattens slightly to the elliptical cross section shown in FIG. 2. After the conduit 1 is emplaced in the trench, the trench is partly filled with sand 36, approximately to half its depth, that is, to about 15 cm. Over the sand there is filled selected soil 37 (see FIG. 4), the composition of which depends upon the plants 39 to be grown. Normally, a bed of humus 38 is made available, into which the roots 40 of the plants can penetrate as they grow. In dry areas or deserts, or for hydroponic gardening, the trench 35 can be completely filled with sand.

Lines of conduit 1 are normally laid parallel to one another, at distances of one to 4 m. or more. The conduits provide rod-shaped moisture sources in the soil, but there is no intent here to specify the extent of the moisture fields presented by the ducts in homogeneous or stratified soil, nor to lay down the amount of moisture that will be present at the surface of the soil. Basically, however, it will be obvious that the surface moisture will be increased with deeper and/or more numerous conduits. The moisture from the conduits diffuses through the soil in a known manner, by capillary action.

In some cases it may be advantageous to install the conduits 1 at a relatively shallow depth, for example, in a 22.5 cm. trench or in a 15 cm. depth of humus, or, for that matter, directly upon the surface of the humus or the soil. The choice of such installation arrangements is dependent upon climate and other local conditions, the kinds of plants to be grown, the available water supply, and the type of water, whether sweet or saline. Therefore no generally valid values can be set forth. A conduit of this invention could also be installed in a trough-like receptacle filled with humus or the like, particularly for a small home garden or a hot-house.

In an installation for an area of substantial width, conduits 1 of this invention will be laid in parallel with one another. For irrigation, the inner ducts 3 of the several conduits will be connected by means of a manifold (not shown) into which water flows from a suitable pressurized or elevated source. For drainage or dewatering, the manifold is connected with a suitable sink, that is, a suction source such as a pump inlet (not shown) or a location that is at a lower elevation than the area to be drained or dewatered.

Because of the existence of the air chamber 26 in the outer duct, above the level of the sump 25 therein, a free circulation is ensured for both watering and drainage, so that drainage can be accomplished at about the same rate as gravity flow watering. During drainage, any slime or soil sediment that enters the ports 23 in the outer duct will settle to the bottom of that duct and cannot rise to the substantially higher level of the ports 8 in the inner duct to block or plug those ports. Furthermore, because water from the inner duct falls through the air chamber 26 during watering, and rises through that chamber during drainage, wind forces and the like, acting through the ports 23 in the outer duct 4, cannot interfere with flow in either direction through the inner duct 3 nor between the inner and outer ducts. It will be apparent that the arrangement permits pressurized watering to be accomplished, as may be desirable for large areas, in addition to being suitable for gravity flow watering and drainage.

In case the trench 37 is formed in nonabsorbent soil, such as clay or soil that has been subjected to compaction, then no special treatment is needed for the trench surfaces. However, to avoid diversion of water to areas between trenches, where the soil is porous and plant growth is to be confined to the areas at trenches, the surfaces of each trench can be wholly or partly lined with a plastic or other water impermeable film.

The ducts, instead of being made of plastic or metal, can be asphalted. In any case, the strength and wall thickness of the outer duct 4 should be so chosen that it cannot be completely flattened, and it thus protects the inner duct 3 against substantial deformation.

A conduit system according to the invention can be formed as a closed system. It can be used for carrying fertilizer into the soil if nutriments are dissolved in water used for irrigation, and this type of fertilization affords a uniform distribution of nutriment in the soil that could otherwise be achieved only by rain. The apparatus can also be used for desalinization in desert areas, by feeding fresh water out through the conduits to an area to be cultivated, and then draining the area to carry away leached-out salt.

With gravity flow irrigation in a desert area, the pressure in the air chamber 26 is raised by daily heating, and water is thereby forced out of the sump 25 so that irrigation is effected in a manner corresponding to pressure watering.

It will be apparent that the apparatus of this invention can be used for purification of waste water by taking advantage of its ability to feed water out into soil or a filter bed or the like and to permit subsequent return flow of the water thus fed out. Such waste water purification applications could in certain cases be employed for fertilizing. Arrangments comprising the apparatus of this invention could also be used as rain collectors.

I claim:

1. Apparatus by which an area of soil can be selectively and alternatively watered and drained, said apparatus being of the type comprising an outer duct and an inner duct that extends lengthwise withing the outer duct, said inner duct being connectable for watering with a water source and being communicable for drainage with a sink to which drainage water can be conducted, said apparatus being characterized by:
A. the inner duct being so secured to the outer duct, in the interior thereof, that when the ducts extend horizontally
   (1) the axis of the inner duct is parallel to the axis of the outer duct, and
   (2) an upper external surface portion of the inner duct is closely adjacent to an upper internal surface portion of the outer duct;
B. the inner duct
   (1) being substantially stiff so as to resist deformation in cross section, and
   (2) having ports through its wall, at intervals along its length, that are at a level between its top and its bottom, but being otherwise substantially imperforate; and
C. the outer duct
   (1) being substantially larger in cross section than the inner duct and sufficiently stiff to maintain a substantially large space in the outer duct that is below the level of said ports, and
   (2) the outer duct having ports through its wall that are spaced along its length and are at a level near its bottom but being otherwise substantially imperforate.

2. The apparatus of claim 1 wherein both of said ducts are normally of substantially circular cross section, further characterized by:
the diameter of the outer duct being between 1.5 and 2.5 times the diameter of the inner duct.

3. The apparatus of claim 1, further characterized by:
the combined areas of the ports in the inner duct being substantially equal to the combined areas of the ports in the outer duct.

4. The apparatus of claim 1 wherein said ports in the inner duct are downwardly adjacent to the horizontal plane containing the axis of the inner duct.

5. The apparatus of claim 1, further characterized by:
said ports in the outer duct
(1) being slot-like,
(2) being elongated in a direction circumferentially of the outer duct, and
(3) being substantially symmetrically arranged in relation to a vertical plane containing the axis of the outer duct.

6. The apparatus of claim 1, further characterized by:
said ducts being disposed in a trench in soil of the area to be watered, which trench
(1) is wider than said outer duct and
is filled around the outer duct with a porous material that enables water issuing from the ports in the outer duct to be moved upwardly in the trench by capillary action.

7. The apparatus of claim 1 wherein said inner and outer ducts are normally of circular cross section, further characterized by:
said outer duct being of sufficiently resilient material to be deformed to an elliptical cross section under its own weight and that of the inner duct, but nevertheless being sufficiently rigid to maintain the bottom of the inner duct spaced a substantial distance above its bottom.

8. A conduit that can be selectively and alternatively employed for irrigating an area from a supply of water and for draining the area to a sink, said conduit being of the type comprising a primary duct and a secondary duct that extend lengthwise substantially parallel to one another, said conduit being characterized by:
A. the primary duct being secured to the secondary duct at the interior thereof and, with the ducts extending horizontally, the primary duct being closely adjacent to the top of the secondary duct all along the length thereof;
B. the secondary duct being substantially larger in cross section than the primary duct, so that there is a substantial space between the bottom of the primary duct and the bottom of the secondary duct;

C. the primary duct having ports opening through its wall at its sides, said ports being at a level between the bottom of the primary duct and its top but the primary duct being otherwise substantially imperforate;

D. the secondary duct having ports opening through its wall, at its sides, said ports in the secondary duct being at a level that is above the bottom of the secondary duct but spaced a distance below the bottom of the primary duct, said secondary duct being otherwise substantially imperforate; and E. the stiffness (1) of the primary duct being such that it substantially maintains its shape in cross section under the weight of unpressurized water in it, and (2) of the secondary duct being such that it supports the primary duct at a level above said ports in the secondary duct 9. The conduit of claim 8, formed in sections that are endwise connectable to one another, each section of conduit comprising a section of primary duct and a complementary section of secondary duct, further characterized by:

F. each section of primary duct being longer than its complementary section of secondary duct and having coupling means on each of its ends, cooperable with mating coupling means on its endwise adjacent primary duct sections; and G. each section of secondary duct having a bulkhead-like wall at each of its ends through which an adjacent end portion of its complementary primary duct section projects.

* * * * *